March 31, 1959 R. H. BLACK ET AL 2,879,997
PIN-SPOTTING MECHANISM
Filed Oct. 15, 1956 9 Sheets-Sheet 4
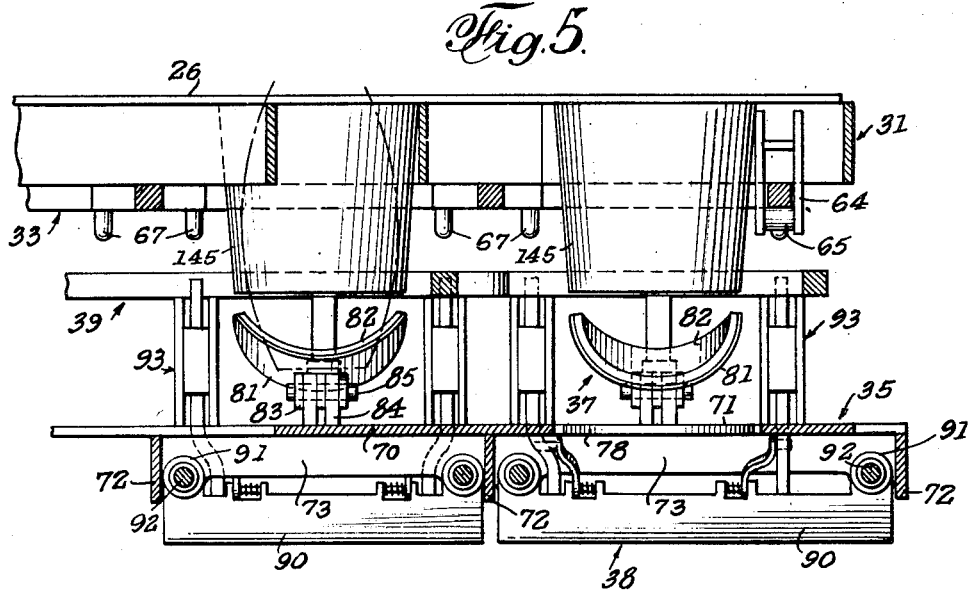
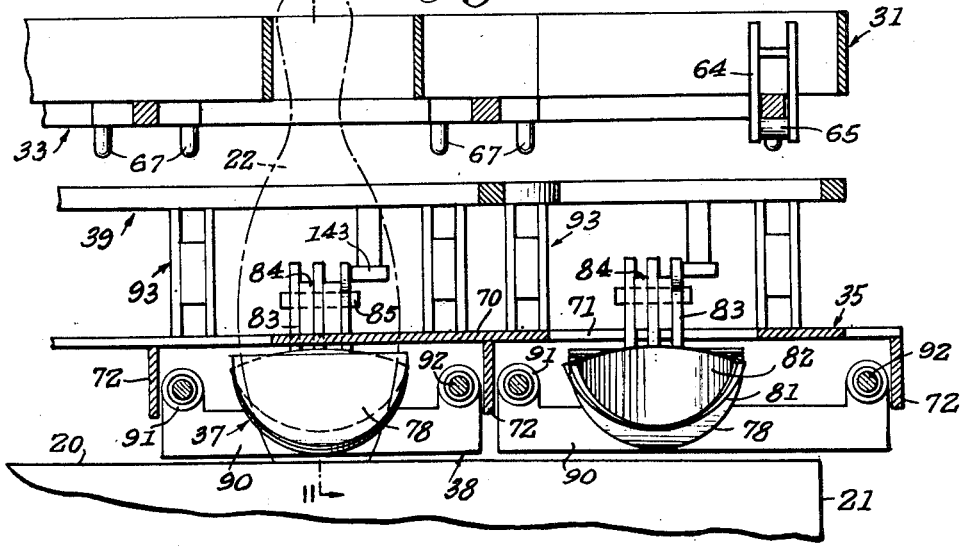
INVENTORS
ROBERT H. BLACK, JOHN G. ROSS
GERALD H. SNODDERLY, STEVE G. JURAN,
FRANK C. DROHMAN
BY C. G. Stratton
ATTORNEY

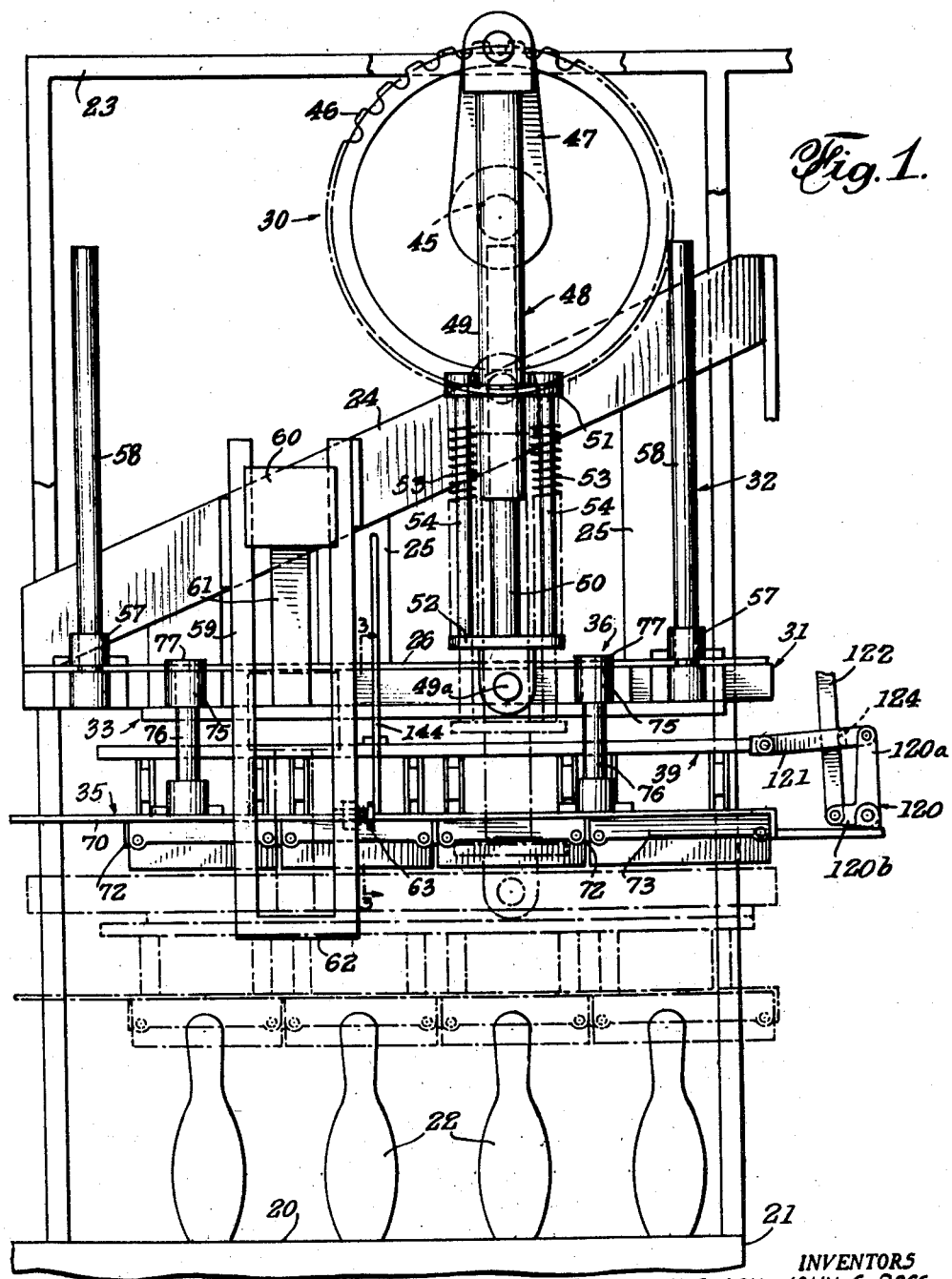

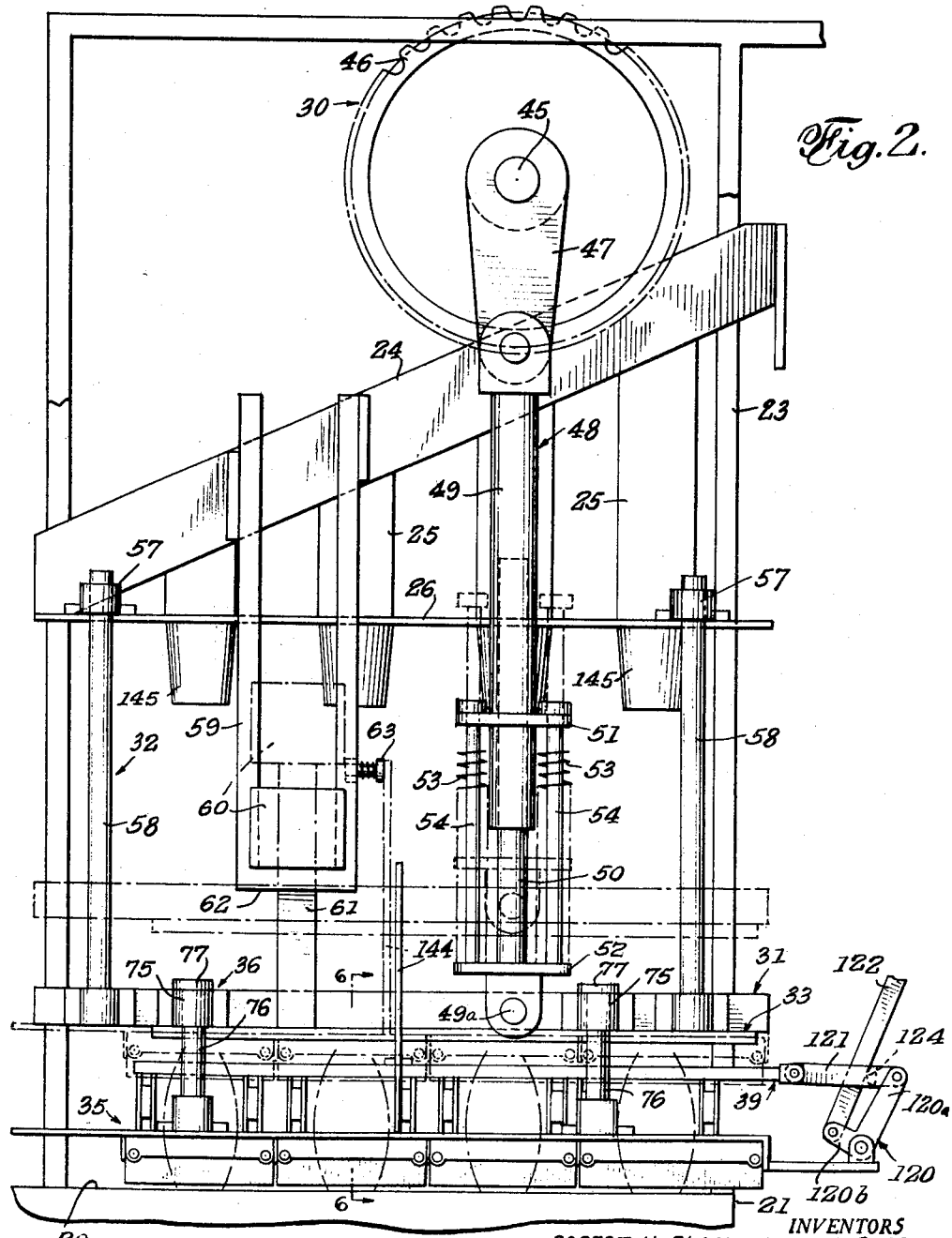

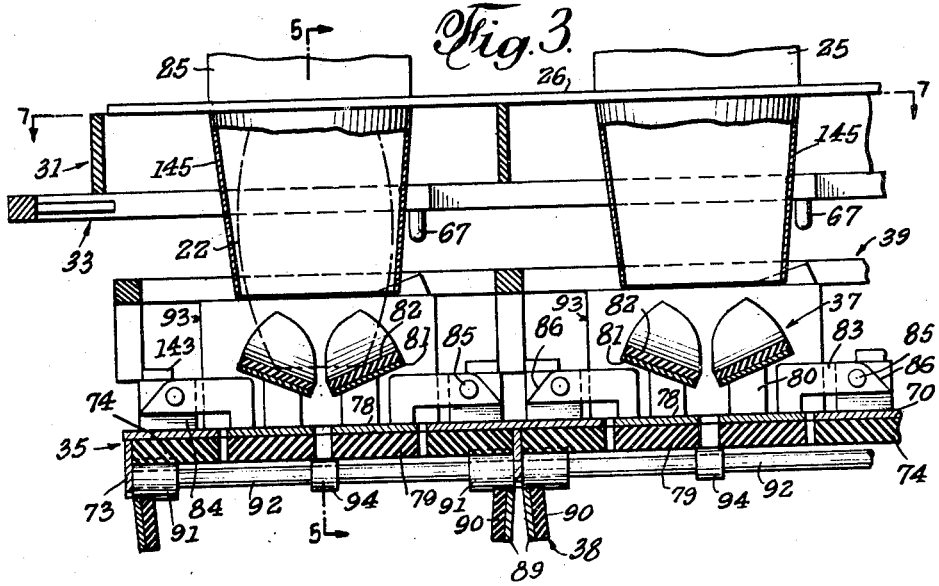
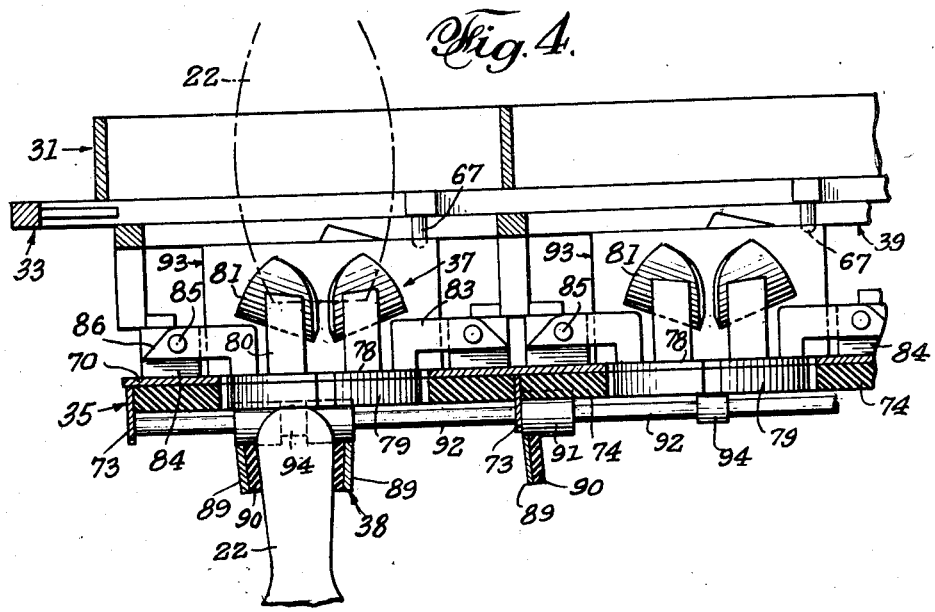

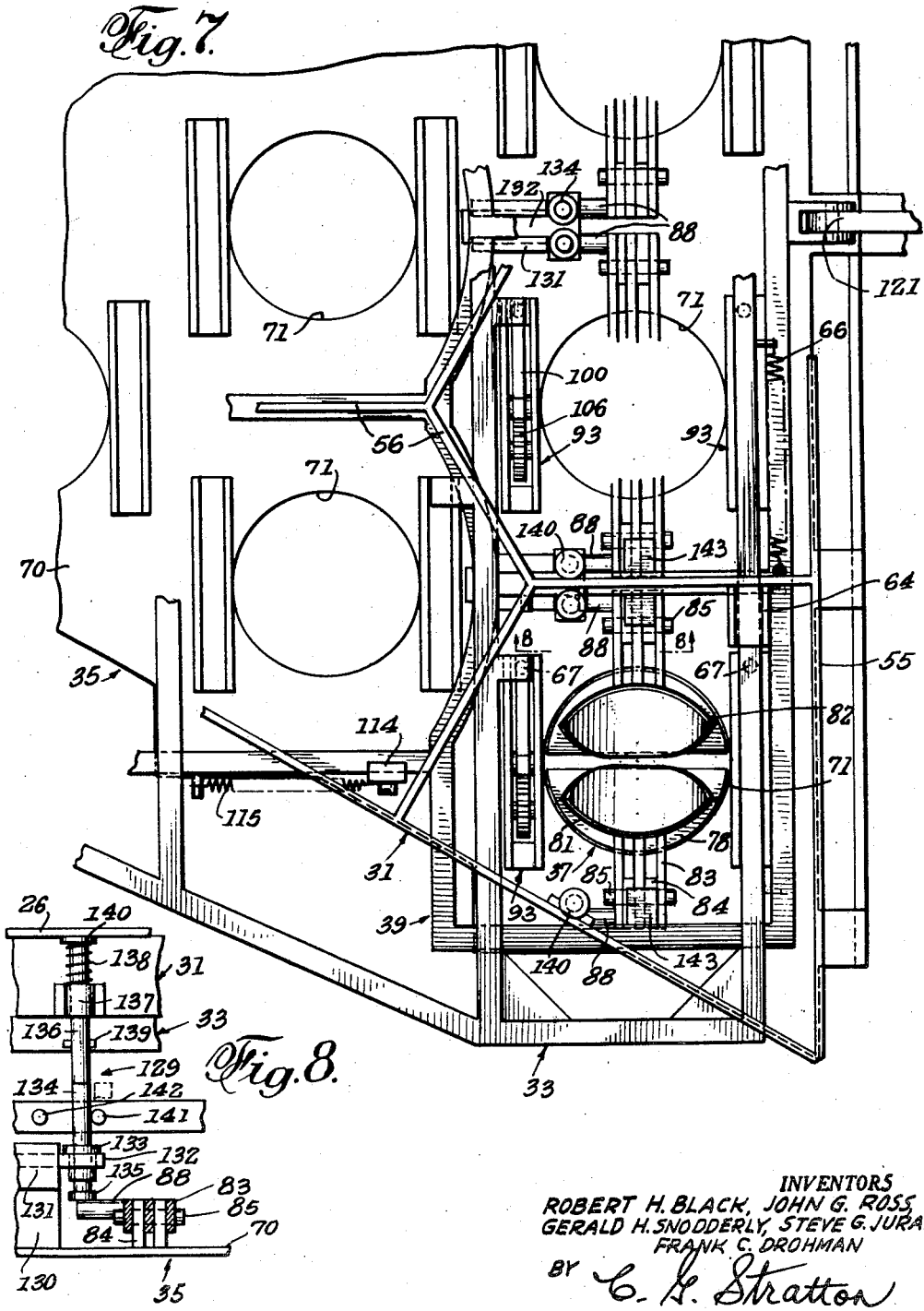

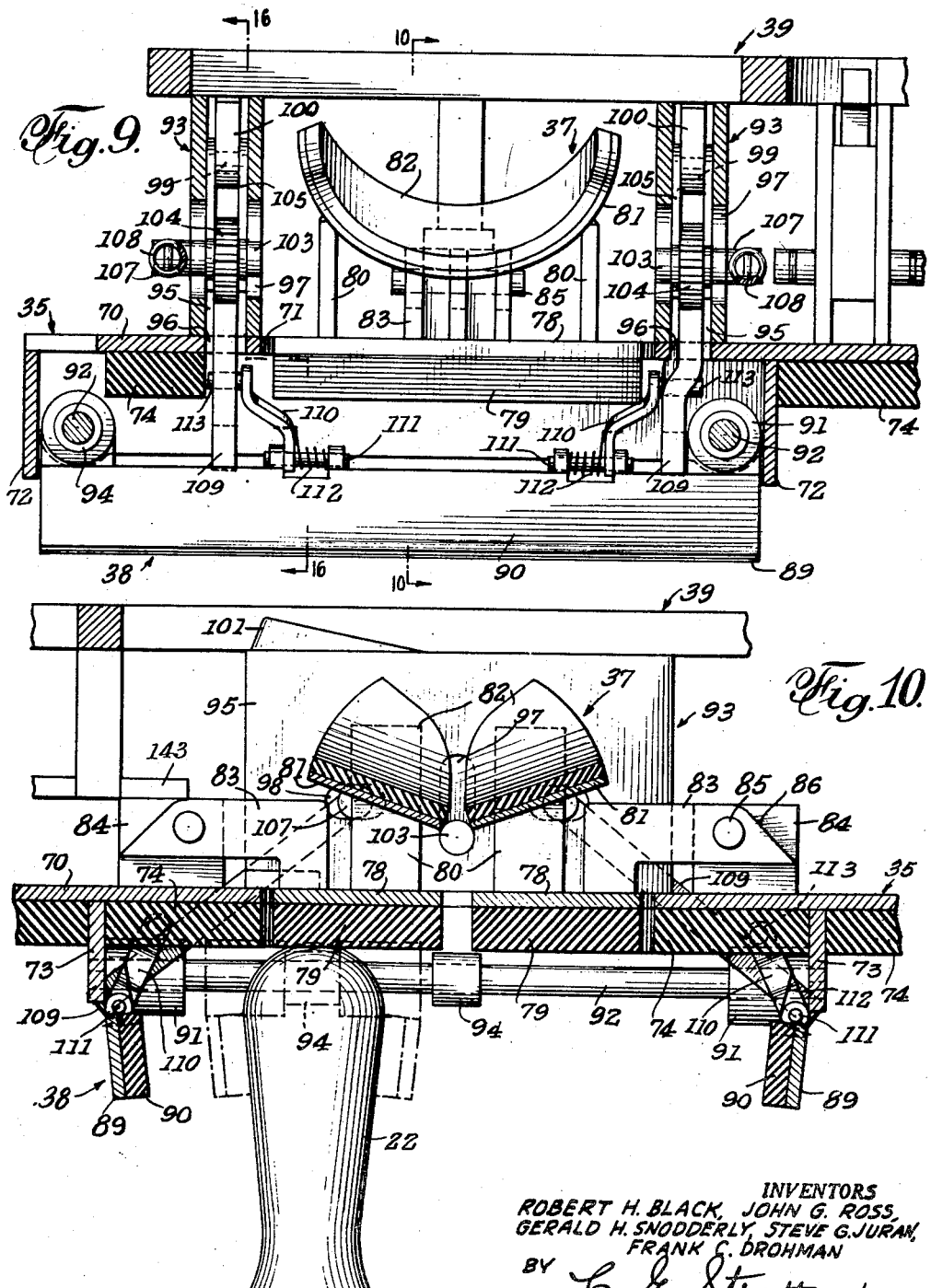

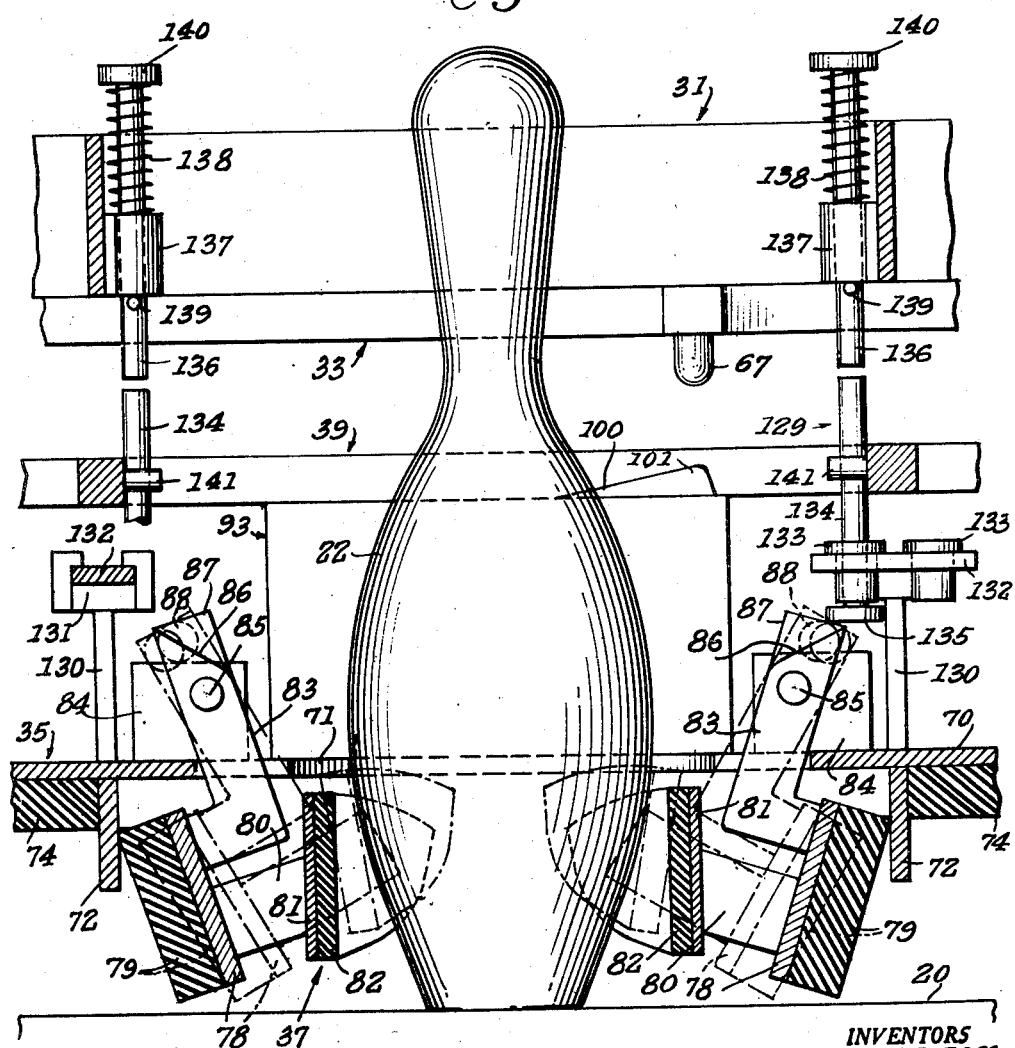

March 31, 1959  R. H. BLACK ET AL  2,879,997
PIN-SPOTTING MECHANISM
Filed Oct. 15, 1956  9 Sheets-Sheet 8
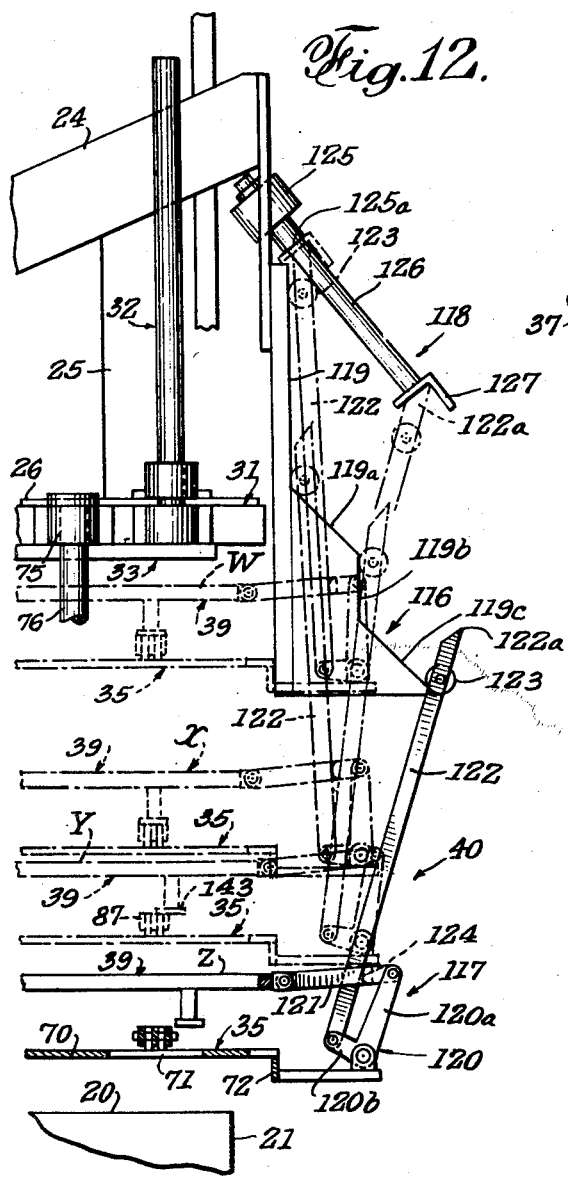
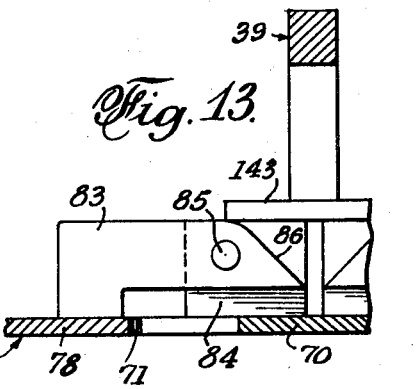
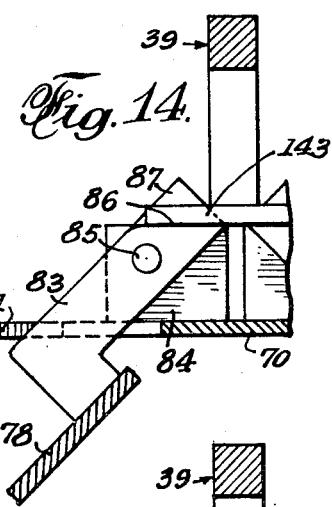
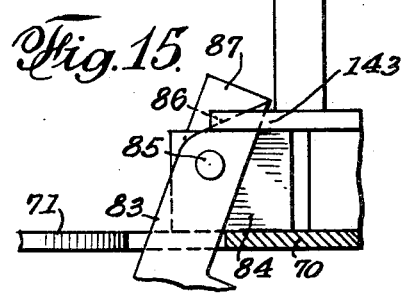
INVENTORS
ROBERT H. BLACK, JOHN G. ROSS,
GERALD H. SNODDERLY, STEVE G. JURAN,
FRANK C. DROHMAN
BY C. T. Stratton
ATTORNEY March 31, 1959 R. H. BLACK ET AL 2,879,997
PIN-SPOTTING MECHANISM
Filed Oct. 15, 1956 9 Sheets-Sheet 9

INVENTORS
ROBERT H. BLACK, JOHN G. ROSS,
GERALD H. SNODDERLY, STEVE G. JURAN,
FRANK C. DROHMAN
BY C. G. Stratton
ATTORNEY United States Patent Office 2,879,997
Patented Mar. 31, 1959

2,879,997
PIN-SPOTTING MECHANISM

Robert H. Black, Los Angeles, John G. Ross, Palos Verdes, Gerald H. Snodderly, Hawthorne, Steve G. Juran, Los Angeles, and Frank C. Drohman, Hawthorne, Calif.

Application October 15, 1956, Serial No. 616,066

8 Claims. (Cl. 273—43)

This invention relates to a mechanism for spotting bowling pins on an alley and for performing the various operations entailed in the lifting and re-spotting of such pins that remain standing after a bowling ball has felled the other pins of the initially spotted set of pins.

In ten-pin bowling, a player is permitted two balls or chances to fell the pins spotted at the end of the alley. If the first ball fells all of the pins, the second is not required and the full complement of pins is then re-spotted, and either the same or a competing bowler has his chance to fell the re-spotted pins. If one or more pins remain standing after the first ball has been delivered, it becomes necessary to first clear the alley and the gutters of such fallen pins that may not have been propelled into the pit at the end of the alley, and to deliver the second ball in an attempt to fell said standing pin or pins. Whether or not such remaining pins are felled by the second ball, the full complement of pins is re-spotted as if they had been felled. In any case, the alley is swept of all pins before such re-spotting. In addition to the foregoing, there is another condition—failure to fell any of the pins with the first ball—and a still further condition—failure to fell any of the pins with both balls. In the first of these conditions, the full complement of pins is treated as if but a few of them remain standing. In the second instance, the alley is swept clear of the standing pins to make room for re-spotting of another set.

It is a general object of the invention to provide simplified and improved means for automatically carrying out the different functions as above set forth and according to the different conditions encountered by the mechanism.

Reference is made to our pending application, Serial No. 555,621, filed December 27, 1955, in which is disclosed a pin distributor, it being an object of this invention to provide spotting mechanism that operates with the complement of ten pins that are stored in said distributor and await release for transport to the alley in proper spotted relationship.

In order to meet the various conditions above set forth, it is another object of the present invention to provide a mechanism that is operated in a dual or two-cycle sequence—one cycle to clear the alley of falling pins and re-spot standing pins that require to be raised while the alley is being swept, and the other cycle to spot a full complement of pins on a cleaned alley.

In the interests of simplicity of construction and operation and durability obviating repair or lay-up time, it is a further object of the invention to provide a single control or operating means or member to carry out the dual operation of the mechanism and to incorporate within the mechanism itself all of the different controls that perform the various functions. Thus, the mechanism is not only resistant to damage, but the same is self-contained and mechanically operable in a positive and efficient manner.

A further object of the invention is to provide mechanism of the character referred to that automatically adapts itself to raising such pins as remain standing after the first ball has been delivered, regardless whether such pins are in their originally spotted position or have been shifted from such position several inches in any direction. Thus, the mechanism provides for accurate re-spotting of unfelled pins to the place to which the same had been shifted or to the original spot, as the case may be.

A still further object of the invention is to provide novel and improved means for transporting the pins from the distributor to the alley in such manner that said pins are accurately placed on their respective spots to insure uniformity of operation at all times.

A yet further object of the invention is to provide for a spring-biased force on the ends of standing pins and to grip the same while so held steady, regardless whether or not they have been shifted from initially-spotted position.

A yet further object of the invention is to provide simple and effective mechanism for engaging the pins being moved between the distributor and the alley to insure their proper positioning on the spots provided.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes, one embodiment of the present invention, which is given by way of illustration or example only.

In the drawings, like reference characters designate similar parts in the several views.

Fig. 1 is a side elevational view of pin-spotting mechanism according to the present invention, the same being shown, in the full-line position, preparatory to delivery of the first ball and, in the dot-dash line position, just before standing pins are lifted from the alley so that the same may be swept.

Fig. 2 is a similar view shown, in the full-line position, depositing a complement of ten pins upon the alley and, in the dot-dash line position, the limit of downward movement of the mechanism when all of the pins have been felled and before the alley is swept.

Fig. 3 is an enlarged vertical sectional view as taken on line 3—3 of Fig. 1.

Fig. 4 is a similar view showing the position of the mechanism according to the dot-dash line position of Fig. 1.

Fig. 5 is a vertical sectional view as taken substantially on the line 5—5 of Fig. 3.

Fig. 6 is a similar view as taken on line 6—6 of Fig. 2.

Fig. 7 is a fragmentary top plan view as taken on line 7—7 of Fig. 3.

Fig. 8 is a vertical sectional view as taken on line 8—8 of Fig. 7.

Fig. 9 is a further enlarged vertical sectional view showing a more detailed version of the mechanism illustrated in the right side of Fig. 5.

Fig. 10 is a vertical sectional view as taken on line 10—10 of Fig. 9.

Fig. 11 is a view similar to Fig. 10 showing the mechanism in the position of Fig. 6, the view being taken substantially on line 11—11 of Fig. 6.

Fig. 12 is a fragmentary side view, to the scale of Figs. 1 and 2, showing operating means that control the condition of the mechanism according to the position thereof above the alley.

Figs. 13, 14 and 15 are enlarged and detailed fragmentary views showing the three positions of control effected by the mechanism shown in Fig. 12.

Figure 17:
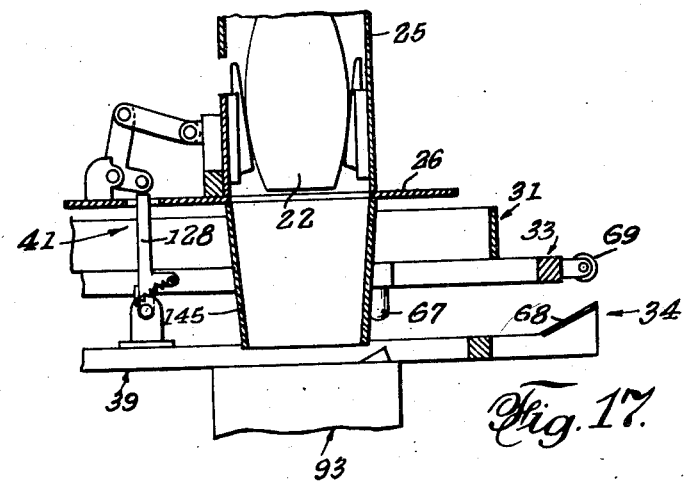
Fig. 17 is a fragmentary vertical sectional view showing control interconnection between the present mechanism and a pin-holding distributor.

A bowling alley is shown at 20, the end 21 thereof being the pit end and in which the balls and a felled complement of pins 22 are adapted to be received. Supported by a frame 23 and above the alley 20, is mounted a distributor 24, the same being adapted to hold a complement of ten pins in the triangular arrangement that they are spotted upon the alley. Said distributor is not here detailed and is shown in the application above mentioned. It will be understood that the pins 22 are disposed in chutes 25 of the distributor, the same being releasably held therein and, when released, will move gravitationally from said chutes. A horizontal plate 26 represents the fixed lowermost base of the distributor 24.

It will be understood that when a ball fells the pins spotted on the alley, said ball and the pins will enter pit 21 and that mechanism is provided for returning the ball to the bowler and for elevating the pins and transporting them to the distributor to assume butt-end-down positions in the ten chutes 25 where said complement of pins awaits release, as above mentioned. See Fig. 7 for the pin arrangement, the same indicating six of the ten positions.

The present spotting mechanism comprises, generally, operating means 30, an auxiliary frame 31 disposed beneath the distributor base plate 26, means 32 to guide said frame for vertical movement between plate 26 and alley 20 under control of said operating means 30, a frame rack 33 carried by the frame 31, means 34 to shift rack 33 laterally, a pin-spotting head 35 beneath the frame 31, means 36 to guide said head for vertical movement between frame 31 and the alley, a complement of ten pin-transporting and -releasing units 37 carried by the head for receiving pins from the distributor 24 and depositing the same in proper spotted position on the alley, a complement of ten units 38 for grippnig the neck ends of standing pins so the same may be raised from the alley prior to sweeping of said alley, a head rack 39 carried by the head, means 40 to shift the rack 39 in a direction transverse to the direction of shift of the frame rack 33, and control means 41 carried by said rack 39 to effect the various coordination movements of the components of the mechanism.

The operating means 30 is best seen in Figs. 1 and 2 and comprises a cross shaft 45 carried by frame 23 above the distributor 24, a sprocket wheel 46 carried by said shaft and driven, for each cycle of operation of the mechanism, through two revolutions, as by a motor or other prime mover, a crank 47 carried by shaft 45 and making the same number of revolutions as the sprocket wheel, and a pitman 48 reciprocated by said crank and connected at 49a to the auxiliary frame 31 to move the same as the crank is rotated.

The pitman 48 is of telescopic design and comprises slidingly interfitted links 49 and 50, the former connected to crank 47 and the latter to frame 31, respective opposed spring abutments 51 and 52 affixed to said links, a pair of compression springs 53 on each side of the pitman between said abutments, and a pair of headed hanger bolts 54 extending axially through the springs and limiting the elongated extent of the pitman by being connected to one said abutment and having their heads in limiting engagement with the other abutment.

Normally, said pitman assumes its greatest length, as limited by the headed studs 54, and the same may foreshorten as the links telescopically contract. The springs produce a resilient biasing force in a direction to extend the telescoped links. Accordingly, the frame 31 may move a vertical distance substantially equal to the throw of crank 47 of 180°, or such lesser vertical distance as may be imposed by means in the path of such movement and absorbed by the mentioned telescopic engagement of the links.

It will be understood that the two-revolution movement of the crank may be instituted in any desirable way and the same comprises no part of this invention. Also, although the sprocket wheel and crank are shown in one-to-one relation, the former may move through but one revolution or more than two for each two revolutions of the crank.

The auxiliary frame 31, shown in plan in Fig. 7, comprises a rigid triangular member 55 generally conforming in size and shape to that of the base plate 26 of the distributor 24, and suitable internal partitions 56 that impart rigidity to member 55.

The frame-guiding means 32 (Figs. 1 and 2) is shown as comprising a set of guide bearings 57 carried by the distributor base plate 26, and a set of aligned guide bars 58 affixed to the frame 31 and slidingly engaged in said bearings. An additional guide is provided, the same comprising a guideway 59 carried by the distributor 24, a block 60 slidingly movable in said guideway, and a connection 61 between said block 60 and the frame 31. The cross bar 62 of the guideway limits the low position of block 60 and, thus, of the frame 31. An intermediate stop 63 for said block is normally engaged and, as engaged, is interposed in the path of the block to limit the descending movement of said frame 31.

The frame rack 33 is connected to frame 31 as by one or more brackets 64 affixed to partitions 56 of said frame, and each is provided with a support roller 65 between which and the lower edge of frame 31 the rack 33 is disposed. Said rack is normally spring biased, as by a spring 66, to have the position relative to frame 31 that is shown in Figs. 3, 4 and 7 and to be shifted toward the left in said Figs. 3 and 4, and toward the bottom in Fig. 7. Said rack 33 is provided with a set of operating studs 67, the same being directed toward the units 38 to operate them, and the studs having two selective positions relative to units 38 to move the latter to pin-gripping or pin-releasing position, as the case may be.

The means 34 for shifting rack 33 against the bias of spring 66 to the position shown in said Figs. 3, 4 and 7 may advantageously comprise a cam plate or the like 68 carried by the head rack 39, and a cam follower 69 carried by said rack 33. When said cam plate and follower are separated, the spring 66 holds the rack 33 in one shifted position. When the rack moves toward the head, said cam plate and follower engage to cause the rack to shift in the manner above indicated.

The pin-spotting head 35 is shown as a plate 70 of triangular shape similar to and oriented with frame 31, said plate being provided with a set of ten holes 71 of a size large enough to pass a bowling pin therethrough. Said ten holes are in register with the chutes 25 of the distributor 24. Said plate 70 is preferably reinforced against buckling, warpage and/or damage by suitable ribs 72 (Figs. 5 and 6) that extend between adjacent holes 71 in one direction, and by ribs 73 (Figs. 3 and 4) that extend between adjacent holes in the transverse direction. It will be clear that said ribs 72 and 73 combine to define flat or plane areas in each of which a hole 71 is provided. Each said area is lined by a compressible and relatively thick liner 74.

The means 36 for maintaining alignment or register between the frame 31 and the head 35 is shown as a set of slide bearings 75 carried by said frame, and a set of studs 76 aligned with and having sliding engagement with said bearings 75. The movement of the head 35 relative to frame 31 is limited by heads 77 on studs 76 engaging the upper faces of bearings 75.

These ten pin-transporting units 37 are all alike. Each such unit comprises two semi-circular plates 78 cooperating to form an extension of each area above mentioned. Normally, therefore, said plates largely fill the hole 71 and are aligned with plate 70, as best seen in Figs. 3, 4

9 and 10. Said unit plates 78 are provided with resilient liners 79 that are similar in thickness to the liner 74. Thus, the holes 71 are normally filled with compressible material so that all of the mentioned areas are adapted to be engaged by the neck ends of pins 22 standing on the alley 20.

It will be understood that any pins 22 that remain standing on the alley after a ball has been delivered will be engaged by said liners or pads 74 or 79. If a pin remains on its spot, it will be engaged by the liner 79 where the edges thereof are parallel on each side of an axis of hole 71. If a pin has been shifted from its spot, even as much as three or four inches, such a standing pin will either engage one of said liners 79 or the liner 74 therearound.

Each semi-circular plate 78, by means of support standards 80, carries a sector-shaped and transversely curved member 81 that is provided with a resilient liner 82. The two members 81 of two related plates 78 cooperate to form a pin-supporting means that, as will later be seen, has three positions—the elevated position wherein the plates 78 are coplanar with the head plate 70, the partly lowered position, as shown by the dot-dash lines of Fig. 11 and in which position the members 81 grip the butt of a pin 22 immediately below the largest diametral portion of the pin, and the fully lowered or spaced position, as shown by the full lines of Fig. 11 and in which position the members 81 release the pin so that it may stand free on the surface of the alley 20.

Each plate 78 is provided with a set of hinge arms 83 and is connected to a hinge block 84 by means of a pin 85. Thus, as can be seen from Figs. 10 and 11, the pin-engaging members may assume any of the mentioned positions. One hinge arm of each set 83 is bevelled at 86, while the others are square-ended, as at 87. The reason for this formation of the arms will later be described. Each arm is provided with a laterally extending pin or lug 88 by means of which the means 37, after release to pin-spotting position, are restored to their initial position aligned with the head plate 70. It will be noted that said lugs 88 are offset outwardly from the hinge pins 85 and that a downward push on said lugs will rock the means 37 back to initial position.

The means 37 has three positions that are controlled by the head rack 39: the normal raised position shown in Figs. 3, 4, 5, 7, 9 and 10; the intermediate position shown by the dot-dash lines of Fig. 11; and the lowered pin-spotting position shown in Fig. 6 and the full lines of Fig. 11.

Figure 16:
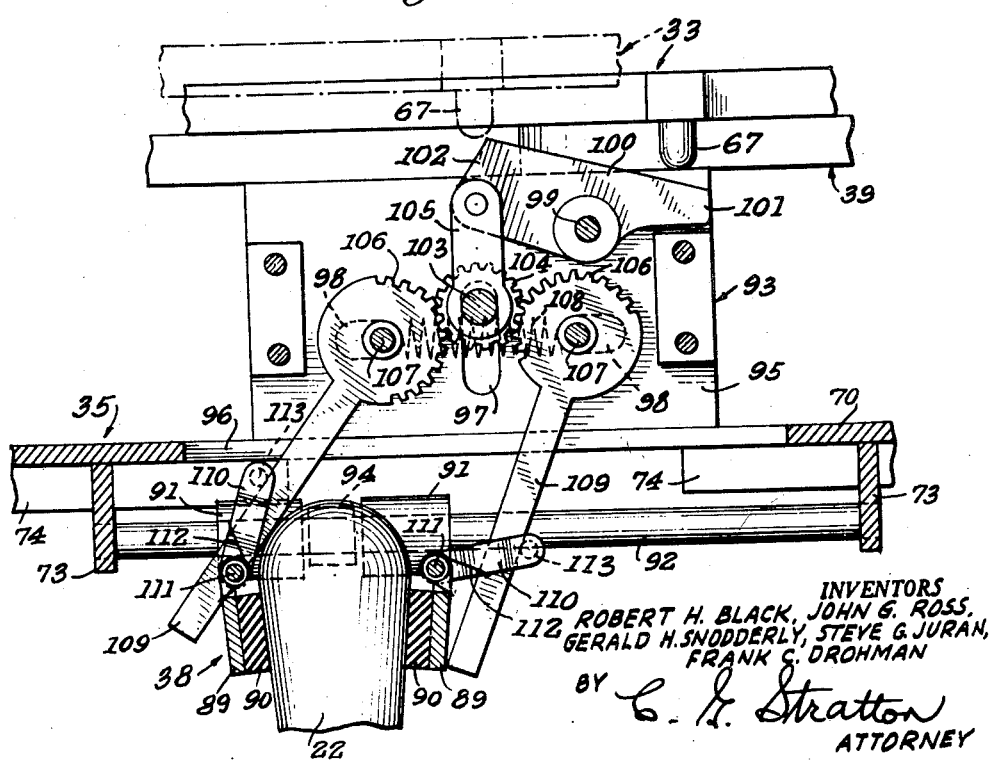
Fig. 16 is a vertical sectional view as taken on line 16—16 of Fig. 9.

The pin-gripping units 38 are best illustrated in Figs. 9, 10 and 16, wherein one of said units is shown. The same comprises a pair of opposed bars 89 provided with resilient liners 90 and having slide bearings 91 that move along a pair of slide shafts 92 beneath the head plate 70. Said shafts 92 are carried by ribs 73 between which the same extend. Thus, the lined bars 89 are disposed beneath the resiliently-lined surface of the head plate and in position to be moved from spread positions adjacent the ribs 73 to positions against opposite sides of the neck of a pin 22, as shown by the dot-dash lines of Fig. 10 and in Fig. 16. The mechanism is provided with a pair of control devices 93 for each pair of bars 89 to move the latter to pin-gripping position regardless of the location of the pin in the generally rectangular area defined by the ribs 72 and 73. In the absence of a pin from such area, the lined bars 89 may collide. To obviate this, a floating spacer collar 94 is provided on each shaft 92 to limit the closed position of the bars 89.

As shown best in Figs. 9 and 16, each control device 93 comprises a box housing 95 fixedly mounted on head plate 70 adjacent the opening 71. The plate 70 is provided with a slot 96 that is aligned with said housing. The walls of said housing are each formed to have a central vertical slot 97 and with flanking horizontal slots 98. On a cross pin 99 is pivotally carried a lever 100 that operates within the housing 95 and is provided with oppositely extending arms 101 and 102 that are of substantially equal length. Said lever 100 constitutes a rocker that may be moved around its pivot pin 99 by depressing one arm or the other.

A cross shaft 103 extends across the housing with its ends engaged in and guided by the slots 97. A pinion gear 104 is freely rotationally carried by said shaft 103, which is connected to the arm 102 of lever 100 by a pair of links 105 that flank the pinion gear 104. It will be seen from Fig. 16 that a stud 67 on the frame rack 33, when aligned with arm 101, will rock lever 100 to raise the pinion gear 104 and that such stud 67, when aligned with arm 102 of said lever, will rock the latter in the opposite direction to lower said pinion gear. The studs 67 for the different devices 93 extend into spaces in rack 39 defined by the triangular member 55 and partitions 56.

Each device 93, in mesh with pinion gear 104, is provided with a pair of mutilated gears 106 carried on shafts 107 that extend across the housing 95 with their ends guided in the slots 98 in the wall of said housing. A spring 108 connects said shafts 107, thereby drawing the gears 106 into mesh with pinion gear 104 regardless of the raised or lowered position of the latter gear. Each mutilated gear 106 is formed with an elongated arm 109, the same extending through slot 96 and in engagement with the upper edge of each bar 89 operatively associated therewith. Thus, the four arms 109 of two devices 93, one on either side of an opening 71 in the head plate, engage with two opposed bars 89 to move the latter to pin-gripping position, as will be described.

The return movement of said bars 89 is effected by means of arms 110 carried by bars 89 on pivots 111 and urged by springs 112 to bias pins 113 into engagement with arms 109 in a direction to bear against the bars 89. Said arms 110 constitute sliding link connections between bars 89 and arms 109 that are retained during all the different angular positions the latter arms may attain, according to the location of a pin 22 in the area defined by ribs 72 and 73.

From the position of the arms 109 shown in Fig. 10, depression of arm 101 of lever 100 will pull pinion gear 104 upwardly and cause similar rotation of both gears 106 in opposite directions to bring the arms 109 together. If there is no pin 22 between bars 89, the bearings 91 thereof will move together with bars 89 until their movement is arrested by collar 94. If a pin 22 is located centrally (on its spot on alley 20), the opposed bars 89 will move into gripping engagement with pin 22, the rocking movement of arms 109 being equal under such condition. If pin 22 is off its spot, as indicated in Figs. 10 and 16, first one arm 109 will move its bar 89 into engagement with said pin on one side. Now, since the mutilated gear 106 of said latter arm has come to rest, continued upward movement of the pinion gear 104 causes the same to rotate on its pivot shaft 103, thereby imparting rotation to the gear 106 of the other arm 109, the rotation being in a direction to bring the latter arm into gripping contact with the opposite side of pin 22. It will be recalled that such gripping engagement of the pin 22 by bars 89 is effected while the force of springs 53 is effective on the head 35 to press the resilient bottom liners thereof against the top of pin 22 to hold the latter steady.

It will be clear from the foregoing that all standing pins 22, gripped as above, will be lifted from the alley upon upward movement of the head. The alley is swept clear of fallen pins at this time. When the head 35 is again moved downwardly to restore the pins carried thereby to the exact spots on the alley from which they had been lifted, depression of arm 102 of lever 100 is effected to lower pinion gear 104 and rotate the gears 106 in a direction to cause spreading of arms 109. The latter, through their sliding and resilient connection to the bars 89 and through the medium of arms 110, will move said bars to spread position as limited by ribs 73.

The above cycle of operation is repeated upon the next depression of the arm 101 of lever 100.

The rack 39 is carried by the head 35 as by mounting brackets 114 (Fig. 7) and is biased by one or more springs 115 in a direction toward the rear of the alley 20. Said rack 39, therefore, is mounted for movement in a direction transverse to that of rack 33. This movement causes operation of the control means 41 and is effected by the means 40.

The means 40 is best shown in Fig. 12 and comprises, generally, a fixed cam unit 116 preferably located at the rear of the distributor 24; linkage 117 operable by said unit 116 to cause the head rack 39 to shift in two stages: the first to align all distributor-operating punches and devices, and the second to effect deposit of pins on the face of alley 20; and means 118 cooperating with said linkage to re-set the rack 39 to initial position.

The cam unit 116 is shown as having a dwell 119, a cam face 119a, a second dwell 119b, and a second cam face 119c, arranged in the order mentioned from top to bottom. Cam face 119a causes movement of the rack 39 to the mentioned first shifted stage and cam face 119c causes movement of the rack to the second shifted stage.

The linkage 117 is shown as a bellcrank lever 120 carried by the pin-spotting head 35 and has its longer arm 120a connected by a link 121 to the head rack. An arm 122, carrying a cam follower 123 which engages cam unit 116, is connected to the shorter arm 120b and extends into abutting engagement with a cross stop 124 provided on link 121. The cam faces 119a and 119c are opposed to said stop.

The means 118 is designed to engage the end 122a of arm 122 to cause depression of said arm and rocking of the bellcrank lever 120 in a direction to restore the rack 39 to its initial unshifted position. Said means 118 is shown as a fixed bearing 125 in which is mounted a gravity slide 126 that is provided with a cross bar 127.

Upon upward movement of the head 35, arm end 122a engages cross bar 127 and causes upward retraction of the slide 126 while the arm 122 is simultaneously swung inward from its cam-projected outwardly-angled position. When cross bar 127 engages stop 125a, the retraction of slide 126 stops. Since this stops the upward movement of the arm 122, the bellcrank lever 120 is re-rotated to cause rack 39 to re-set.

The control means 41 may comprise one or more members, preferably in the form of punches that may effect operative control of components of the distributor 24 and such other components of a pin-setting machine as are necessary to bring bowling pins to said distributor. As examples, said control means may comprise one or more punches for restoring pin-guiding chutes, if the same are used in the distributor, restoring a distributor chute that guides the path of the pins to the distributor 24, releasing a lock that controls feed of pins to said distributor, etc. It is these controls that are referred to in connection with the first stage of shift of the rack 39, as explained above. Since these controls may be varied, the same do not comprise features of this invention. However, since release of the pins 22 from the distributor 24 is important to the invention, the control means 41 may include at least one or more punches 128 that effect such release when the rack 39 is moved to its central position, i.e., the first shifted position.

Said means 41 also includes the mechanism 129 shown in Figs. 8 and 11, for restoring the pin-transporting units 37 to their initial elevated position. Said mechanism engages projecting lug 88 to rock the arms 83 so as to swing said arms to bring the plates 78 back into the plane of plate 70 of the head 35.

Said mechanism 129 is shown as a bracket 130 carried by plate 70 and provided with a slideway 131 for a slide 132. Depending whether said slide serves one or two arms 83, the same is provided with one or two bushings 133 in each of which is slidingly fitted a punch 134, the lower head 135 of which rests upon lug 88 in all positions thereof. A headed stem 136 is guided in a slide bearing 137 and operatively associated with each punch 134, a spring 138 biasing said stem upwardly and a cross pin 139 on the stem limiting the upward position. The head 140 of each such stem is adapted to be depressed when the frame 35 is raised in a direction toward the plate 26 of the pin distributor 24. When so depressed, and the stems and punches being aligned, the heads 135 of the latter will engage lugs 88 to swing the means 37 in the manner above referred to.

As shown in Fig. 8, the rack 39 is provided with suitably spaced pins 141 and 142, one on each side of each punch 134. It will be realized that according to the shifted position of rack 39, said pins 141 and 142 will shift punch 134 into and out of alignment with stem 136.

Figs. 13, 14 and 15, more particularly, show the raised, intermediate, and lowered positions of the means 37, as controlled by the shift of rack 39. In connection with the ends 87 and bevels 86 of each set of arms 83, there is provided a member 143 that in one position (Fig. 13) overstands said ends 87 to hold the means 37 raised, in a second position (Fig. 14) overstands only the bevel 86 to allow plates 78 to drop to the pin-holding position shown, and in the third position (Fig. 15) is clear of both the ends 87 and bevel 86 to allow the plates 18 to fall to their lowermost position to effect release of a pin, as in the full lines of Fig. 11.

The head rack 39 is provided with a member 144 that normally engages stop 63 to hold the same, against its spring, in block-intercepting position. Movement of said rack 39 under bias of spring 115 allows said stop to move to block-clearing position.

Tubular guides 145 may extend downwardly from the base plate 26 of the distributor and in line with the chutes 25 to insure proper guiding of the pins 22 as they leave the distributor.

*Operation*

It will be assumed that the crank 47 is at the top of its stroke, as in Fig. 1, with the parts of the present mechanism in the position of Figs. 1, 3 and 5. Also, that the alley 20 has been previously provided with a complement of ten bowling pins 22. In this condition, the frame rack 33 is in the position shown in Figs. 7 and 11 with all the studs 67 vertically aligned with the arms 101 of levers 100, the head rack 39 is in its leftmost position as shown in Fig. 1 and in position W of Fig. 12, said arms being in their raised condition, spreading arms 109 and holding bars 89 spread.

A bowling ball is delivered toward said pins 22. If none of the pins is felled, or only some of them are felled, the crank 47 is set into rotation by any suitable switch means (that is operated by the force of said ball) that controls rotation of shaft 45. The mechanism starts down with the weight thereof suspended from pitman 48. The standing pins 22, whether one or all ten of them, will arrest the downward movement of the head 35 at the dot-dash line position of Fig. 1, and the position shown in Fig. 4 and at X of Fig. 12.

Since the crank 47 continues to rotate, the pitman links 49 and 50 telescope to the dot-dash line position of Fig. 1, compressing springs 53 and imposing the force of said springs on the head 35. This results from the auxiliary frame 31 catching up with the head and achieving the closed-up position of Fig. 1. The studs 67 will, therefore, encounter the raised arms 101 of levers 100 to rock said levers on their pivots 99 and cause the arms 109 to move the opposed bars 89 toward each other into gripping engagement with all standing pins 22.

Now, the crank 47 starts upwardly, first removing the spring force on the pins 22, then raising frame 31 and its rack 33 and then, through the medium of heads 77 on guide studs 76, raising the head 35 and the pins 22 carried by the means 38 thereof. After said pins are raised clear of the alley, the latter may be cleared of fallen pins by any suitable sweeping mechanism.

As the frame 31 nears the bottom plate 26 of the distributor, the rack 33 thereof is shifted laterally against the bias of springs 66 (Fig. 7) by the cam plate 68 and follower 69 (Fig. 17). In this position, the rack 33 may be latched to the rack 39 and not again released until the second return of the crank 47 to the top of its throw.

The second descent of the crank 47 causes replacement of the raised bowling pins to the exact spots or places on the alley from which they had been lifted. The release of such pins is effected by the studs 67 now encountering the arms 102 of the levers 100 and spreading arms 109 and bars 89 back to their initial positions. Upon return to top dead center of the crank, the means 30 stops operating and the parts come to rest ready for the second ball to be delivered.

If, upon delivery of the first ball, all of the pins 22 are felled, the means 30 is set into operation as before, and the head 35 starts downwardly. The first descent of the crank 47 will bring said head 35 to the dot-dash line position of Fig. 2 and to the position Y of Fig. 12—a position that is wholly clear of any fallen pins that may be on the alley at the time, but somewhat lower than the position of arrest caused by standing pins 22. The stop 63, by stopping descent of block 60 in guideway 59, limits this position of the mechanism.

When the head 35 moves between positions W and X of Fig. 12, the rack 39 remains unshifted because the cam follower 123 merely tracks along the dwell 119 of cam unit 116. However, when the head 35 does not encounter standing pins and moves to position Y, the cam follower engages cam face 119a and, by pushing arm 122 outwardly, causes rack 39 to shift to the central position mentioned. This causes shift of rack 39 sufficient to move member 143 clear of arm end 87. Thus, the plates 78 will drop to the angular position of Figs. 11 and 14 and the lined curved members 81 will move to the pin-receiving and -holding position of the dot-dash lines of Fig. 11.

Upon return of the crank 47 and raising of the mechanism, the cup members 81 are in ready position to receive pins 22 released from the distributor as the frame 31 approaches engagement with plate 26. Since the rack 33 has remained vertically spaced from the pin-gripping means 93 and the arms 101 thereof, the latter have remained unactivated.

As the crank 47 again descends, the head 35 carries a full complement of pins. Now, since the stop 63 is released, the head 35 may move to its lowermost position, as shown by the full lines of Fig. 2 and at Z of Fig. 12. As the head reaches this position, the cam face 119c has completed movement of rack 39 to its second shifted position, freeing the cup members 81 to swing apart around the pivots 85. This effects release of the pins 22 by the cup members 81, as shown best in Fig. 11, the pins moving downward but slightly, settling gently and without shift upon the alley 20.

When the crank 47 moves up the second time, the means 129 returns the pin-engaging means 37 to initial latched position just before the crank reaches top dead center. The mechanisms 117 and 118 cooperate to cause reshifting of the rack 39 to initial position, as hereinbefore described, as the head moves back to raised position W. In this connection, it will be recalled that the head moves upward from position Y to position W. Since arm end 122a is at an angle that will allow the same to clear cross bar 127, the rack 39 remains in the mentioned central position. However, from position Z, the raising of the head results in reshift of rack 35, as before mentioned.

By sweeping the alley after a second ball has been delivered (whether or not said ball fells any more pins), the operation of the mechanism after such second ball is the same as when all of the pins have been felled with the first ball.

While the foregoing has illustrated and described what we now contemplate to be the best mode of carrying out our invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described our invention, what we claim and desire to secure by Letters Patent is:

1. In mechanism of the character described, a vertically reciprocative pin-transporting head provided with pin-supporting means and pin-gripping and -raising means, a relatively movable rack connected to said head, said rack being provided with means controlling the position of the pin-supporting means, said latter means being pivotally mounted and adapted to fall by gravity to pin-releasing position upon release by the control means of the rack, a second rack connected to move toward and from the head and the first-mentioned rack, and control means on said second rack to operate the pin-gripping means.

2. In mechanism according to claim 1, means operable upon upward movement of the head to engage the released pin-supporting means to restore the same to pin-supporting position.

3. In mechanism according to claim 1, means to shift the pin-gripping means from gripping to non-gripping position, said latter means comprising a bellcrank lever mounted to be operated by the head during movement thereof toward and from an alley, said bellcrank lever being connected to be moved by movement of the head, and means controlling movement of the bellcrank having different elevated locations relative to said alley.

4. A pin-spotting mechanism comprising, in combination, a fixed pin-holding distributor spaced above the spot end of a bowling alley and holding a complement of bowling pins in normal spotting arrangement, an auxiliary frame disposed beneath said distributor means mounting said frame for movement between a position adjacent the distributor and a position nearer to the alley, a drive means to move the frame, means interconnecting the distributor and frame and affording straight-line movement of the latter, a control rack carried by and beneath the frame, means to move said rack laterally of the frame, a head beneath said rack and provided with pin-transporting and pin-gripping means, means interconnecting the frame and the head and affording straight-line movement of said head relative to both the frame and the distributor, a control rack carried by the upper portion of the head, means to move the latter rack in a direction transverse to the movement of the frame-carried rack, means operable by the first rack to control the pin-gripping means, and means operable by the second rack to control the pin-holding means.

5. A pin-spotting mechanism according to claim 4 and comprising, in combination, means interengaging the two racks to effect the mentioned movement of the first rack.

6. A pin-spotting mechanism according to claim 4 and comprising, in combination, means interconnecting the distributor and the head and movable by the latter to effect the mentioned movement of the second rack.

7. In mechanism of the character described and provided with a pin-holding distributor provided with pin-releasing means and disposed above the pin-spotting end of a bowling alley, a pin-transporting head provided with pin-releasing means and movable in the space between said distributor and the alley, said head being provided with a shiftably-mounted control rack, and means to shift said rack comprising a bellcrank lever carried by the head and having engagement with said rack, and a link having one free end and one end connected to the bellcrank lever, said link moving the bellcrank lever to various positions upon movement of the head, as before mentioned.

8. In mechanism according to claim 7, a second rack, the mentioned bellcrank lever being operatively connected to control the movement of both said racks and the pin-releasing operation of the pin-transporting head and the pin-holding distributor, and means fixed relative to the alley and operating the bellcrank lever to perform the mentioned operations during vertical movement of the mentioned head.

References Cited in the file of this patent

UNITED STATES PATENTS

| | | |
|---|---|---|
| 2,550,919 | Frye | May 1, 1951 |
| 2,634,979 | Schon | Apr. 14, 1953 |
| 2,736,554 | Fluke | Feb. 28, 1956 |
| 2,781,195 | Holloway | Feb. 12, 1957 |